United States Patent [19]
Sommer

[11] 3,903,135
[45] Sept. 2, 1975

[54] METHOD FOR METHYLATING AND QUATERNIZING

[75] Inventor: Harold Z. Sommer, Havre de Grace, Md.

[73] Assignee: The United States of America as represented by the Secretary of the Army, Washington, D.C.

[22] Filed: Mar. 29, 1967

[21] Appl. No.: 628,225

[52] U.S. Cl. .............. 260/482 C; 260/999; 424/300
[51] Int. Cl.[2] ........................................ C07C 125/00
[58] Field of Search .......... 260/482 C; 167/30 G, 47

[56] References Cited

OTHER PUBLICATIONS

Adams et al., Chem. Reviews, Vol. 65, pp. 567 and 595–602 (1965).

*Primary Examiner*—Leland A. Sebastian
*Attorney, Agent, or Firm*—Nathan Edelberg; Robert P. Gibson; Kenneth Van Wyck

[57] ABSTRACT

The method of producing a toxic compound in high yields by methylating and quaternizing a primary amine wherein the synthesis without the aid of elevated temperatures and pressures is carried out in the presence of a steric hindered organic base and methylating agent. The said compound having the formula:

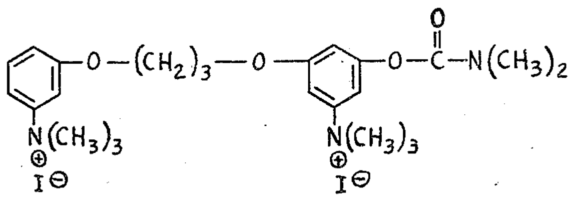

5 Claims, No Drawings

METHOD FOR METHYLATING AND QUATERNIZING

This invention relates to a new method for preparing 1-(3-dimethylaminophenoxy)-3-(3-dimethylamino-5-dimethylcarbamoxyphenoxy) propane dimethiodide:

The object of my invention is to prepare the above compound by a new method having many advantages over the prior art method of preparation.

Another object of this invention is to produce a lethal agent in high yields wherein the novel method is suitable for industrial production.

The compound may be utilized in any munition suitable for handling relatively non-toxic agents such as spray tanks, shells, bombs, rockets and aerosol generators which have been previously devised for chemical warfare agents. For example, the compound may be volatized in a resilient type of container and through means of pressurized gas squeezed out therefrom into a gas stream and dispersed in the air with a high rate of vaporization.

Compound A acts mostly on the peripheral cholinergic nervous system and thereby interfering with the normal process of neuromuscular impulse transmission and thus disrupts the propagation of impulses from nerves to muscle. The said compound is extremely toxic at relatively low dose levels. Intraveneous $LD_{50}$ is 8$\mu$g/kg in rabbits and 16 $\mu$g/kg in mice.

Albert Funke et al in *Bull. Soc. Chem.*, page 744, (1953) have previously prepared the above compound (A) by the following scheme:

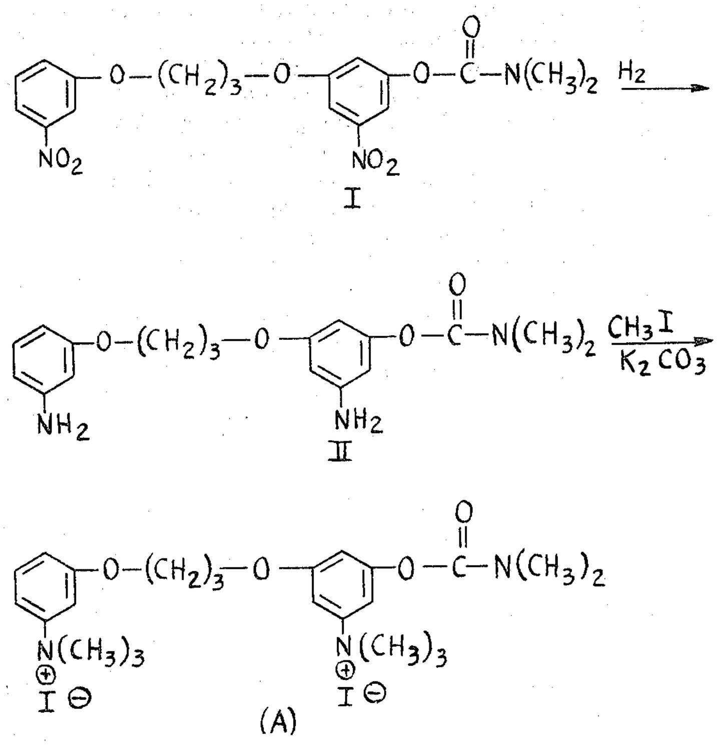

I

II (A)

Hydrogenation of compound I utilizing nickel and Raney catalyst to the corresponding amino compound II is conventional in the art. Compound II, oily in character, is stirred in the presence of methyl alcohol, potassium carbonate and methyl iodide and heated at 100°C. in a sealed tube for 15 hours, producing compound A. The end product precipitates during the process and is recrystallized in the absolute alcohol.

Upon investigation of the above procedure, it was found that the quaternizing step requiring the long period for heating and pressure to effect the synthesis triggered many undesirable side reactions and concomitant low yields of pure compound. Experience has shown that the alkaline reaction medium is necessary, but the low yields, the use of pressure and heating equipment and the 2 phased mixture are disadvantages to large scale production.

Experimentation was instituted to investigate what other agents could be utilized, capable of generating an alkaline medium without the objectionable features of the Funke et al method.

Attempts to increase the yield of the desired product by employing other inorganic alkaline reagents were not fruitful. Attention was directed to organic reagents, but difficulty was soon encountered here since the organic compound capable of generating an alkaline medium was itself being quaternized during the synthesis. Accordingly, there was a competitive reaction of quaternization taking place between the organic base and compound II.

It was surprising and unexpected to discover that the reaction could be carried out rapidly and in good yields when a steric hindered pyridine was employed as the agent for creating the alkaline medium. The unobviousness in the use of the steric hindered pyridine was that the entire quaternization could be carried out at an ambient temperature, no pressure is required, and the reaction mixture is homogeneous. This discovery is a forward step in this art since no pyrolysis and hydrolysis products are formed according to my method.

The major reaction scheme of my invention can be represented by the following equations:

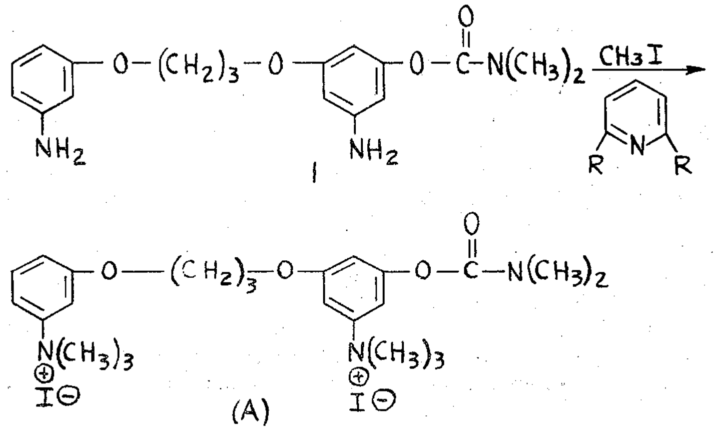

R= Lower alkyl 1-(3-nitrophenoxy)-3-(3-nitro-5-dimethylcarbamoxyphenoxy) propane (1.0 gram, 2.5 m moles) was catalytically reduced (3 atm., $PtO_2$) in ethanol in the usual manner. After the completion of the hydrogenation, the catalyst was removed by filtration and the solvent removed under reduced pressure (50 mm) and the oily residue, compound 1, was obtained. Compound 1 was dissolved in 10 ml of dimethylformamide, 10 ml of methyl iodide was added, and the mixture was stirred at room temperature for about one hour. The steric hindered 2,6 dimethyl pyridine (5 m moles) was added with stirring for an additional half hour. A second addition of the steric hindered 2,6 dimethyl pyridine (2,6-lutidene) (5 m moles) was made and stirring continued for an additional 3 hours during which time the product, compound (A), precipitated from the mixture. However, the total amount of the said pyridine can be added in a single step. Ethanol (50 ml) was added to the final reaction mixture which was then allowed to stand overnight at room temperature. The crude product that was separated from the reaction mixture weighed 1.25 grams, m.p. 170°–172°. An additional 0.15 grams was recovered from the filtrate by the addition of ethanol. The crude product was recrystallized from 1:1 absolute alcohol-acetone after storing the mixture in the cold. The crystalline material was collected and dried, m.p. 182°–184°C.

Analysis of compound 2: $C_{24}H_{37}N_3I_2O_4$
Calculated: C, 42.06; H, 5.44; O, 9,34.
Found: C, 42.1; H, 5.5; O, 9.3.

It is apparent that certain modifications can be made in the above scheme without departing from the scope of the present invention. Other steric hindered bases may be employed for creating the alkaline medium.

The foregoing example and detailed description have been given for the benefit of clarity only, and the scope of the invention is not to be construed as limited strictly thereto.

I claim:

1. The method for methylating and quaternizing comprising: stirring dimethylformamide and methyl iodide in the presence of 1-(3-aminophenoxy)-3-(3-amino-5-dimethylcarbamoxyphenoxy) propane, subsequently adding steric hindered dialkyl pyridine to the reaction medium and obtaining the product 1-(3-dimethylaminophenoxy)-3-(3-dimethylamino-5-dimethylcarbamoxyphenoxy) propane dimethiodide.

2. The method according to claim 1, wherein the dialkyl pyridine is 2,6-dimethyl pyridine.

3. The method according to claim 1, wherein the dialkyl pyridine is added in two separate steps.

4. The method according to claim 1, wherein ethanol is added to the product in the reaction mixture and a crude product is collected.

5. The method according to claim 4, wherein the crude product is recrystallized from an absolute alcohol-acetone mixture.

* * * * *